US009827726B2

(12) United States Patent
Norton

(10) Patent No.: US 9,827,726 B2
(45) Date of Patent: Nov. 28, 2017

(54) TIRE TREAD AND METHOD OF MAKING THE SAME

(71) Applicant: Bridgestone Bandag, LLC, Muscatine, IA (US)

(72) Inventor: Craig B. Norton, Iowa City, IA (US)

(73) Assignee: Bridgestone Bandag, LLC, Muscatine, IA (US)

(*) Notice: Subject to any disclaimer, the term of this patent is extended or adjusted under 35 U.S.C. 154(b) by 332 days.

(21) Appl. No.: 14/402,558

(22) PCT Filed: May 30, 2013

(86) PCT No.: PCT/US2013/043339
§ 371 (c)(1),
(2) Date: Nov. 20, 2014

(87) PCT Pub. No.: WO2013/181378
PCT Pub. Date: Dec. 5, 2013

(65) Prior Publication Data
US 2015/0283774 A1    Oct. 8, 2015

Related U.S. Application Data

(60) Provisional application No. 61/653,013, filed on May 30, 2012.

(51) Int. Cl.
| B29D 30/52 | (2006.01) |
| B60C 1/00 | (2006.01) |
| B60C 11/02 | (2006.01) |
| B60C 11/00 | (2006.01) |
| C08L 17/00 | (2006.01) |

(52) U.S. Cl.
CPC .......... B29D 30/52 (2013.01); B60C 1/0016 (2013.01); B60C 11/00 (2013.01); B60C 11/02 (2013.01); C08L 17/00 (2013.01); C08L 2207/24 (2013.01); C08L 2555/34 (2013.01)

(58) Field of Classification Search
CPC ....... B29D 30/52; B60C 1/0016; B60C 11/02; C08L 17/00
See application file for complete search history.

(56) References Cited

U.S. PATENT DOCUMENTS

| 2,345,518 | A | * | 3/1944 | Wendel | ............... B29C 47/0047 |
| | | | | | 152/175 |
| 4,146,508 | A | | 3/1979 | Maxwell | |
| 4,161,464 | A | | 7/1979 | Nicholas | |
| 4,400,488 | A | | 8/1983 | Lal et al. | |
| 4,434,018 | A | | 2/1984 | Brewer | |
| 5,356,939 | A | | 10/1994 | Burrowes et al. | |
| 5,510,419 | A | | 4/1996 | Burgoyne et al. | |
| 5,883,139 | A | | 3/1999 | Wideman et al. | |
| 6,077,874 | A | | 6/2000 | Wideman et al. | |
| 6,133,413 | A | | 10/2000 | Mouri et al. | |
| 6,207,723 | B1 | | 3/2001 | Matsushita et al. | |
| 6,333,373 | B1 | | 12/2001 | Rouse et al. | |
| 6,380,269 | B1 | | 4/2002 | Benko et al. | |
| 6,407,180 | B1 | | 6/2002 | Wideman et al. | |
| 6,420,457 | B1 | | 7/2002 | Wicks | |
| 6,479,558 | B1 | | 11/2002 | Fliermans | |
| 6,565,918 | B2 | | 5/2003 | Hughes et al. | |
| 6,588,471 | B2 | | 7/2003 | Majumdar et al. | |
| 6,590,042 | B1 | | 7/2003 | Tang | |
| 6,620,363 | B2 | | 9/2003 | Farris et al. | |
| 6,632,918 | B1 | | 10/2003 | Matsushita et al. | |
| 6,660,791 | B2 | | 12/2003 | Wideman et al. | |
| 6,797,757 | B2 | | 9/2004 | Wideman et al. | |
| 6,956,065 | B2 | | 10/2005 | Van Duin | |
| 7,506,677 | B2 | | 3/2009 | Sandstrom | |
| 2005/0037199 | A1 | | 2/2005 | Kino et al. | |
| 2005/0284556 | A1 | | 12/2005 | Sandstrom | |
| 2007/0185239 | A1 | | 8/2007 | Tirelli et al. | |
| 2012/0125505 | A1 | | 5/2012 | Incavo et al. | |

FOREIGN PATENT DOCUMENTS

| CN | 1891446 A | 1/2007 |
| CN | 101220178 A | 7/2008 |
| CN | 101306580 A | 11/2008 |
| CN | 101518956 A | 9/2009 |
| EP | 0931809 A2 | 7/1999 |
| EP | 0931809 A3 | 7/2000 |
| GB | 2446681 A | 8/2008 |
| JP | 56-010534 A | 2/1981 |
| JP | 56010534 A | 7/2006 |
| JP | 2006348179 A | 12/2006 |

(Continued)

OTHER PUBLICATIONS

Australian Government IP Australia, Patent Examination Report No. 1, dated Sep. 4, 2015, 6 pages.
Hong, Sung Ran, International Search Report with Written Opinion from PCT/US2013/043339, 13 pp. (dated Aug. 23, 2013).
Ritter, Nicola, Supplementary European Search Report from European Patent Application No. 13797391, 3 pp. (dated Dec. 10, 2015).
Japanese Office Action from JP2015-515184, 5 pp. (dated Dec. 8, 2015).
Jing, Zhang, Chinese Office action from Chinese Application 201380028165.3, 14 pp. (dated Jan. 5, 2016).

(Continued)

*Primary Examiner* — Stella Yi

(57) ABSTRACT

A method of making a tire tread includes mixing a tire tread compound including a virgin rubber component and a reclaimed rubber component, forming a green sheet from the tire tread compound, and curing the green sheet to form a cured tire tread. The reclaimed rubber component may have a Mooney viscosity (ML (1+4) @ 100° C.) of greater than 65. The reclaimed rubber component may also have a crosslink density that is between 20 and 50% of the crosslink density of the reclaimed rubber prior to reclaiming.

14 Claims, No Drawings

(56) References Cited

FOREIGN PATENT DOCUMENTS

JP            2007126518 A    5/2007
KR         20030040642 A    5/2003

OTHER PUBLICATIONS

Notification of Reasons for Refusal, JP application No. 2015-515184, Japanese Patent Office, dated Dec. 8, 2015, 4 pages, English translation 6 pages.
European Search Report, EP application No. 13797391.3, European Patent Office, dated Dec. 17, 2015, 6 pages.

* cited by examiner

TIRE TREAD AND METHOD OF MAKING THE SAME

FIELD OF THE INVENTION

One or more embodiments of the present invention relates to a tire tread including a reclaimed rubber component. In certain embodiments, the present invention relates to methods of making a tire tread including a reclaimed rubber component.

BACKGROUND OF THE INVENTION

Rubber waste, and particularly tire rubber waste, is an area of increasing concern for a number of reasons. Accordingly, substantial efforts are made to develop and implement methods of recycling waste rubber as a way to reduce the environmental impact and the amount of virgin rubber used. Various uses for ground rubber have been developed, such as, for example, as fuel and use in running tracks and other high impact and high traffic surfaces.

In other instances waste rubber may be mixed with virgin rubber to form new rubber products. The waste rubber may be mixed with the virgin rubber in particle form, or may be reclaimed, also sometimes referred to as devulcanized, to allow the recycled rubber to bond with the virgin rubber during vulcanization. Prior art rubber products and methods of making rubber products including recycled rubber have focused on providing a reclaimed rubber with a lower Mooney viscosity in order to provide better processability. A significant expense in producing reclaimed rubber can be grinding the rubber particles prior to the reclamation process. In addition, the levels of low Mooney viscosity reclaimed rubber that can be used in a new rubber product is limited due to a reduction in performance characteristics of the product if too much reclaimed rubber having a low Mooney viscosity is introduced.

It is known in the tire art to use reclaimed rubber in new products, including tire treads and tire tread compounds. Generally, reclaimed rubber refers to rubber that has been crosslinked and subsequently treated to break down the crosslinked network and thereby make the rubber processable. The treatment may break or sever the sulfur crosslinks and/or sever the polymer chains.

As known in the art, reclaimed rubber has been used in the manufacture of retreads, which are tire treads applied over a used tire carcass that has been prepped by removing any of the original tread. The cost of reclaimed rubber can, however, deter its use. One factor driving the cost of reclaimed rubber is the degree to which the rubber is treated. Conventional wisdom suggests treating the cured rubber to an extent that the reclaimed rubber has properties, such as the ability to be mixed, that are similar to virgin rubber.

Other challenges in using reclaimed rubber include the relative amount of reclaimed rubber that may be used in the tire tread compound. Currently, the amount employed is a relatively small percentage of the total rubber included because greater amounts of reclaimed rubber have resulted in unacceptable characteristics and performance of the tire tread.

The ability to use reclaimed rubber nonetheless remains desirable and therefore there is a need to address the problems that currently exist in the art . . .

SUMMARY OF THE INVENTION

One or more embodiments of the present invention provide a method of manufacturing a tire tread including mixing a tire tread compound including a virgin rubber component and a reclaimed rubber component, the reclaimed rubber component having a Mooney viscosity (ML (1+4) @ 100° C.) of greater than 65; forming a green sheet from the tire tread compound; and curing the green sheet under pressure to form a cured tire tread.

One or more embodiments of the present invention also provides a method of manufacturing a cured tire tread including mixing a tire tread compound including a virgin rubber component and a reclaimed rubber component, the reclaimed rubber component having crosslink density between 5 and 70% of the crosslink density of the reclaimed rubber prior to devulcanization; extruding the tire tread compound to form a green extrusion that is in the form of a generally flat green sheet; and curing the green sheet under pressure to form a cured tire tread including a reclaimed rubber component.

DETAILED DESCRIPTION OF THE ILLUSTRATIVE EMBODIMENTS

Aspects of the invention are based, at least in part, on the discovery of a tire tread that is formed using partially reclaimed rubber. While the prior art contemplates the use of reclaimed rubber, it is believed that the desire to use highly reclaimed rubber (e.g. rubber is that highly devulcanized) gives rise to one or more problems currently experienced in the art. Thus, contrary to conventional wisdom, it is believed that by employing reclaimed rubber that is treated to a lesser extent than conventional reclaimed rubber, the amount of reclaimed rubber employed in a tire tread can be increased. And, by employing reclaimed rubber that is treated to a lesser extent than conventional reclaimed rubber, it is believed that the properties of the tread can be improved over those treads resulting from current practice.

One or more embodiments of the invention relate to a tire tread and/or a tire tread compound including rubber, of which a portion is a virgin rubber component and a portion is a reclaimed rubber component. In certain embodiments, the tire tread and/or tire tread compound may include a reclaimed rubber component that has a Mooney viscosity that is reduced less than reclaimed rubber components used in conventional rubber products. In one or more embodiments, a method of manufacturing a tire tread may include the steps of mixing a tire tread compound including a reclaimed rubber component, the reclaimed rubber component having a Mooney viscosity (ML (1+4) at 100° C.) of greater than 65. In certain embodiments, the method of manufacturing the tire tread may further include the steps of fabricating a green tire tread from the tire tread compound, and vulcanizing the green tire tread to form the tire tread.

Tread Formulation

In one or more embodiments, the tire tread compound of the present invention may include a vulcanizable rubber component. In certain embodiments, the vulcanizable rubber component may include both a virgin rubber component and a reclaimed rubber component.

Virgin Rubber

In one or more embodiments, the virgin rubber component may include any conventional vulcanizable rubber used in the tire industry, including both natural and synthetic rubbers. In certain embodiments, these vulcanizable rubbers, which may also be referred to as elastomers, may include natural or synthetic poly(isoprene), and elastomeric diene polymers including polybutadiene and copolymers of conjugated diene monomers with at least one monoolefin monomer. In certain embodiments, the virgin rubber component may include styrene-butadiene rubber (SBR). In the same or other embodiments, the virgin rubber component may include high cis butadiene rubber.

In one or more embodiments, the virgin rubber component of the tire tread compound may include 100 percent by weight natural rubber. In other embodiments, the virgin rubber component of the tire tread compound may include 100 percent by weight synthetic rubber. In still other embodiments, the virgin rubber component of the tire tread compound may include a blend of natural and synthetic rubbers.

Reclaimed Rubber

In one or more embodiments, the reclaimed rubber component may be formed from recycled tire rubber. In certain embodiments, the reclaimed rubber component may be formed from recycled tire tread buffings generated during a retreading process. As will be understood by those skilled in the art, the reclaimed rubber component includes one or more elastomers and any fillers, reinforcements, processing aids and other additives used in the original tire tread or other rubber component.

As used herein, the term reclaimed rubber refers to an elastomer that has been made at least partially flowable, or is at least partially "devulcanized" in any known process allowing it to be incorporated into new rubber products. Reclaimed rubber may also be referred to as devulcanized rubber, and the term devulcanized, as used herein, refers to the process of breaking down chemical cross-links in the recycled rubber. Reclaiming rubber may involve main chain scission, crosslink scission, or a combination of main chain and crosslink scission. The term fully reclaimed may refer to rubber that has been made flowable by a significant reduction in Mooney viscosity. The term partially reclaimed may refer to rubber that has a reduced Mooney viscosity as compared to the rubber prior to reclaiming, but a higher Mooney viscosity than fully reclaimed rubbers. The partially reclaimed rubber may or may not be flowable.

For example, in certain embodiments, the reclaiming process may include first grinding the rubber to be recycled into suitably small particles and then subjecting the particles to heat and/or shear forces. U.S. Pat. No. 7,189,762 discloses a process for reclaiming rubber in more detail, and is incorporated herein by reference for that purpose. Other known reclaiming methods may utilize ultrasonic methods, chemical components, microwaves and/or microorganisms. However, it should be appreciated that any known process for devulcanizing or reclaiming the recycled rubber may be employed within the scope of the present invention.

In one or more embodiments, the reclaimed rubber component may be characterized by a crosslink density that is between approximately 5 and 70% of the crosslink density of the rubber prior to devulcanization, in other embodiments between 10 and 60% of the crosslink density of the rubber prior to devulcanization, in still other embodiments between 20 and 50% of the crosslink density of the rubber prior to devulcanization, and in yet other embodiments, between 25 and 45% of the crosslink density of the rubber prior to devulcanization. The crosslink density may be determined according to ASTM-D6814 (Standard Test Method for Determination of Percent Devulcanization of Crumb Rubber based on Crosslink Density). In certain embodiments, it is contemplated that the reclaimed rubber may have a higher crosslink density than conventional reclaimed rubbers used in tire tread compounds.

In the same or other embodiments, the reclaimed rubber component may be characterized by a crosslink density that is greater than 5% of the crosslink density of the rubber prior to devulcanization, in other embodiments greater than 10% of the crosslink density of the rubber prior to devulcanization, in still other embodiments greater than 15% of the crosslink density of the rubber prior to devulcanization, in yet other embodiments greater than 20% of the crosslink density of the rubber prior to devulcanization, and in still other embodiments greater than 25% of the crosslink density of the rubber prior to devulcanization.

In one or more embodiments, the reclaimed rubber component may be characterized by a Mooney viscosity (ML (1+4) @ 100° C.) of between approximately 65 and 120, in other embodiments between approximately 70 and 110, in still other embodiments between approximately 75 and 100, and in yet other embodiments between approximately 80 and 95. In the same or other embodiments, the reclaimed rubber component may be characterized by a Mooney viscosity (ML (1+4) @ 100° C.) of greater than 65, in other embodiments greater than 70, in still other embodiments greater than 75, and in yet other embodiments greater than 80.

Other Tread Formulation Ingredients

In one or more embodiments, the tire tread compound may include known fillers and additives in conventional amounts. For example, the tire tread compound may include one or more of reinforcing fillers such as carbon black, processing oils, antidegredants, and cure packages.

Ingredient Amounts

In general, the tire treads of this invention include at least 35 percent by weight, in other embodiments at least 35 percent by weight, in other embodiments at least 40 percent by weight, in other embodiments at least 45 percent by weight, and in other embodiments at least 50 percent by weight rubber, based on the entire weight of the tread (i.e. the rubber component accounts for, for example, at least 35 percent by weight of the tread). In these or other embodiments, the treads include at most 85 percent by weight, in other embodiments at most 80 percent by weight, in other embodiments at most 75 percent by weight, in other embodiments at most 70 percent by weight, and in other embodiments at most 65 percent by weight rubber, based on the entire weight of the tread.

In one or more embodiments, the vulcanizable rubber component of the tire tread compound may include from about 55 to 99 percent by weight SBR, in other embodiments from about 60 to 95 percent by weight SBR, in still other embodiments from about 65 to 90 percent by weight SBR, and in yet other embodiments from about 70 to 85 percent by weight SBR based on the total weight of the vulcanizable component.

In one or more embodiments, the rubber component of the tire tread compound may include from about 5 to 45 percent by weight high-cis butadiene rubber, in other embodiments from about 10 to 40 percent by weight high-cis butadiene rubber, in still other embodiments from about 15 to 35 percent by weight high-cis butadiene rubber, and in yet other embodiments from about 20 to 30 percent by weight high-cis butadiene rubber based on the total weight of the rubber component.

In one or more embodiments, the rubber component of the tire tread compound may include between approximately 1 and 25 percent by weight reclaimed rubber, in other embodiments between approximately 5 and 20 percent by weight reclaimed rubber, and in still other embodiments between approximately 10 and 15 percent by weight reclaimed rubber based on the total weight of the rubber component. In these or other embodiments, the rubber component may include at least 1 percent by weight, in other embodiments at least 3 percent by weight, in other embodiments at least 5 percent by weight, in other embodiments at least 7 percent by weight, and in other embodiments at least 9 percent by weight rubber, based on the entire weight of the rubber component. In these or other embodiments, the rubber component may include at most 50 percent by weight, in other embodiments at most 40 percent by weight, in other embodiments at most 30 percent by weight, in other embodiments at most 20 percent by weight, and in other embodiments at most 15 percent by weight rubber, based on the entire weight of the rubber component.

In one or more embodiments, the tire tread compound may further include a ground vulcanized rubber that has not been devulcanized, such as rubber produced from grinding worn tire treads during retreading. In certain embodiments, the tread composition may include from about 0.1 and 10 parts by weight of a ground vulcanized rubber, in other embodiments between approximately 1 and 8 parts by weight ground vulcanized rubber, and in still other embodiments between approximately 2 and 6 parts by weight ground vulcanized rubber, per 100 parts by weight of the rubber component (which may be referred to as simply 100 parts by weight rubber or phr).

In one or more embodiments, the tire tread compound may further include from about 35 to about 75 parts by weight carbon black per hundred parts rubber (phr), in other embodiments from about 40 to about 70 parts by weight carbon black phr, in still other embodiments from about 45 to about 65 parts by weight carbon black phr, and in yet other embodiments from about 50 to about 60 parts by weight carbon black phr.

In one or more embodiments, the tire tread compound may include processing oils, such as, for example, aromatic processing oils. In certain embodiments, the tire tread compound may include from about 5 to about 15 parts by weight processing oil phr, in other embodiments from about 7 to about 13 parts by weight processing oil phr, and in still other embodiments from about 8 to about 12 parts by weight processing oil phr.

Method of Making Vulcanizable Composition

In one or more embodiments, the method of making the tire tread compound may include mixing the virgin rubber component, the reclaimed rubber component, and the fillers and additives to form a tire tread compound. In certain embodiments, the virgin rubber component may be first mixed with one or more additives prior to mixing with the reclaimed rubber component to form the tire tread compound. In other embodiments, the virgin rubber may first be mixed with the reclaimed rubber to form the vulcanizable rubber component prior to compounding of the additives, such as fillers, processing oils, and the like to form the tire tread compound. In certain embodiments, the virgin rubber component, the reclaimed rubber component, and any additional additives and fillers may be mixed simultaneously. In one or more embodiments, the virgin rubber component, reclaimed rubber component and other additives and fillers, excluding a cure system, may be mixed first to form a master batch. In these embodiments, the cure system may be added and mixed in a subsequent mixing step performed at lower temperatures, as is well known to those skilled in the art. Compounding and mixing may be performed using conventional mixing equipment and techniques as are known to those skilled in the art.

Tread Fabrication

In one or more embodiments, the tire tread compound, following mixing, may be formed into a green tire tread. In certain embodiments, the tire tread compound may be extruded to form an elongate green extrusion. In one or more embodiments, the tire tread compound or green extrusion may optionally be calendered to form a relatively flat green sheet. In other embodiments, the green extrusion may be in the form of a generally flat green sheet immediately following extrusion. In certain embodiments, the green sheet may be cut to a desired size for use on a tire.

In one or more embodiments, the green tread is used in the construction of a green tire, and the green tire is subsequently place into a mold and cured using conventional tire building technique's.

In other embodiments, the green tread is employed in a retreading operation. For example, the green sheet may be placed in a mold and vulcanized to create a vulcanized tire tread including reclaimed rubber pursuant to practice of one or more embodiments of this invention. In certain embodiments, the vulcanizing of the tire tread may occur at elevated temperatures and pressures. In particular embodiments, the mold in which the green sheet is cured may form a tread pattern in the cured tire tread. In certain embodiments, the vulcanized tire tread may then be used in retreading applications. U.S. Pat. No. 4,434,018 discloses suitable retread curing equipment and methods, and is incorporated herein by reference for that purpose.

Tread Properties

It is believed that the amount of reclaimed rubber in the tire tread compound may be increased as compared to conventional tire tread compounds utilizing reclaimed rubbers by virtue of the characteristic properties disclosed. In particular, the relative increase in crosslink density and Mooney viscosity, as compared to conventional reclaimed rubbers, is believed to provide better tire tread performance than tire treads formed using the conventional reclaimed rubbers. Additionally, the reclaimed rubber of the tire tread and methods of the present invention allows for a reduction in processing, thereby reducing costs.

In order to demonstrate the practice of the present invention, the following examples have been prepared and tested. The examples should not, however, be viewed as limiting the scope of the invention. The claims will serve to define the invention.

EXAMPLES

Compounds A1-A8 & Compounds B1-B6:Tire Tread Compounds

Samples A1 through A4 are rubber compositions of the type that are useful for preparing tire treads that can be used in the retreading of truck tires. Each sample included the same ingredients except for the type of reclaimed rubber employed, which was used in the amount of 12.5 volume percent reclaimed rubber, based on the total volume of the composition. While the method by which the rubber was reclaimed was not known with specificity, the reclaimed rubber used in Samples A1-A4 was obtained from the same source and was believed to be similarly processed except for the degree of processing, which results in the varying Mooney viscosities as detailed in Table 1. The reported Mooney Viscosity represents Mooney measurement immediately after processing (i.e. reclamation) and therefore does not account for any aging of rubber, which is believed to lead to an increase in the Mooney.

Samples B1 through B3, which like Samples A1-A4 are rubber compositions of the type that are useful for preparing tire treads that can be used in the treading of truck tires, were prepared in manner similar to A1-A4 except that the source of the reclaimed rubber, as well as the method by which the rubber was reclaimed, was different. The details of the reclaimed rubber are also set forth in Table 1.

TABLE 1

Physical Properties of Compounded Treads

| Sample | Reclaimed Rubber Mooney | BFG Heat Buildup (° C.) | Nick Energy (J) | 100% Mod (MPa) | 300% Mod (MPa) | Elongation (%) | Tensile Strength (MPa) | Compound Mooney |
|---|---|---|---|---|---|---|---|---|
| A1 | 42 | 33 | 9.78 | 1.91 | 8.36 | 543.04 | 17.92 | 71.7 |
| A2 | 58.7 | 33 | 11.4 | 1.86 | 8.10 | 528.89 | 16.27 | 69.5 |
| A3 | 67 | 33 | 10.6 | 1.97 | 8.60 | 534.67 | 17.85 | 72.8 |
| A4 | 91 | 32 | 10.6 | 2.03 | 9.01 | 512.15 | 17.70 | 75.1 |
| B1 | 63 | 32 | 10.3 | 1.81 | 8.26 | 465.03 | 14.75 | 77.9 |
| B2 | 74 | 33 | 10.6 | 1.83 | 8.30 | 450.83 | 14.27 | 77.6 |
| B3 | 140 | 30 | 9.17 | 1.89 | 8.61 | 432.55 | 13.99 | 81.75 |

Both the reclaimed rubber and the compound Mooney viscosity, ML (1+4) 100° C., was tested according to ASTM D-1646. 100% Modulus, 300% Modulus, Elongation, and Tensile Strength were testing according to ASTM D-412. BFG Heat Buildup is a useful indicator in showing the benefit of less reclamation and results in improved tread wear. The BFG Heat Buildup was measured according to ASTM D-623 Method A.

The Nick energy, which may also be referred to as Nick Tear resistance, is an indicator of fracture mechanics and was tested according to conventional procedures. For a better understanding of the technique, refer to "Energy Dissipation and the Fracture of Rubber Vulcanizates" by Gary R. Hamed published on pages 493-500 of the proceedings of the meeting of the Rubber Division, American Chemical Society, Las Vegas, Nev., May 29 to Jun. 1, 1990.

The data shows that practice of the invention produces rubber compositions that are characterized by advantageous heat build-up (i.e. lower heat build-up) and advantageous Nick Tear resistance, while other properties of the compound were not deleteriously impacted.

Various modifications and alterations that do not depart from the scope and spirit of this invention will become apparent to those skilled in the art. This invention is not to be unduly limited to the illustrative embodiments set forth herein.

What is claimed is:

1. A method of manufacturing a tire tread comprising:
   a. mixing a tire tread compound including a rubber component, wherein the rubber component includes a virgin rubber component and from 1-25 weight percent of a reclaimed rubber component based on the total weight of the rubber component, the reclaimed rubber component having a Mooney viscosity (ML (1+4) @ 100° C.) of greater than 65 and a crosslink density of greater than 25% of the crosslink density of the reclaimed rubber prior to devulcanization;
   b. forming a green sheet from the tire tread compound;
   c. placing the green sheet in a mold; and
   d. curing the green sheet under pressure to form a cured tire tread.

2. The method of claim 1, where said Mooney viscosity of the reclaimed rubber component is between approximately 65 and 120.

3. The method of claim 1, where said step of mixing further includes mixing one or more additives with the rubber component, the one or more additives selected from a filler, a processing oil, an antidegredant, and a curative.

4. The method of claim 1, where the step of forming a green sheet includes extruding the tire tread compound to form a green extrusion.

5. The method of claim 4, where the green extrusion is in the form of a generally flat green sheet.

6. The method of claim 1, further comprising the step of cutting the green sheet to a desired size prior to curing.

7. The method of claim 1, where the virgin rubber component includes styrene-butadiene rubber.

8. The method of claim 1, where the virgin rubber component includes high cis butadiene rubber.

9. A method of manufacturing a cured tire tread comprising:
   a. mixing a tire tread compound including a rubber component, wherein the rubber component includes a virgin rubber component and from 1 to 25 weight percent of a reclaimed rubber component based on the total weight of the rubber component, the reclaimed rubber component having crosslink density of greater than 25% of the crosslink density of the reclaimed rubber prior to devulcanization;
   b. extruding the tire tread compound to form a green extrusion that is in the form of a generally flat green sheet; and
   c. curing the green sheet under pressure to form a cured tire tread including a reclaimed rubber component.

10. The method of claim 9, where the reclaimed rubber component has a Mooney viscosity of between approximately 70 and 90.

11. The method of claim 9, where said step of mixing further includes mixing one or more additives with the rubber component, the one or more additives selected from a filler, a processing oil, an antidegredant, and a curative.

12. The method of claim 9, further comprising the step of cutting the green sheet to a desired size prior to curing.

13. The method of claim 9, where the virgin rubber component includes styrene-butadiene rubber.

14. The method of claim 9, where the virgin rubber component includes high cis butadiene rubber.

* * * * *